Nov. 2, 1965 E. GÖTZ ETAL 3,215,986

DATA ASSEMBLING SYSTEM

Filed March 26, 1962 3 Sheets-Sheet 1

Inventors:

Elmar Götz & Peter Boese

By: George H. Spencer

Attorney

Nov. 2, 1965 E. GÖTZ ETAL 3,215,986

DATA ASSEMBLING SYSTEM

Filed March 26, 1962 3 Sheets-Sheet 2

Inventors:

Elmar Götz & Peter Boese

By: George H. Spencer

Attorney

DATA ASSEMBLING SYSTEM

Filed March 26, 1962 3 Sheets-Sheet 3

Inventors:
Elmar Götz
Peter Boese
By: George H. Spencer
Attorney

United States Patent Office 3,215,986

Patented Nov. 2, 1965

3,215,986
DATA ASSEMBLING SYSTEM

Elmar Götz and Peter Boese, both of Berlin-Frohnau, Germany, assignors to Licentia Patent-Verwaltungs-G.m.b.H., Frankfurt am Main, Germany Filed Mar. 26, 1962, Ser. No. 182,227
Claims priority, application Germany, Mar. 30, 1961, L 38,598
4 Claims. (Cl. 340—172.5)

The present invention relates to a control arrangement.

There exist machine tools which are controlled by means of punched paper tape which carries encoded commands for the machine tool to follow. The tape runs through an appropriate reader which interrogates the tape and produces an output, preferably in electronic form, corresponding to the hole combination on the tape. In practice, any of the standard 5- to 8-hole systems of coding may be used, with the 8-hole tape being the one which is normally used for controlling machine tools. Such 8-hole tape has a width of 8 bits.

In the numerical control of machine tools, it sometimes happens that there appear commands or the like whose width is a multiple of the 8 bit width which can be applied to the tape. At times, commands having a width of 20 bits may be necessary; such a width represents, in the decimal system, $2^{20}$, or about 1,000,000. This value of 1,000,000 is expedient for controlling machine tools because if the coordinate to be traversed has a length of about 10 meters, the smallest unit is 10 $\mu$m. This means that the control arrangement has to be able to recognize the 1,000,000 numbers which correspond to a selected width of 20 bits.

It would, of course, be possible, to represent all of the digits of such a value simultaneously in an appropriate punched tape having a width of 20 holes. Under certain circumstances the width of the tape could be even greater if, for example, a plurality of coordinates are to be run. Assuming there are two coordinates, then each row of the punched tape would have 40 holes, or 20 per coordinate. This would then mean that all of the digits of all of the coordinates are represented at one time. In practice, however, even 40 holes would not suffice if it is desired to produce all of the necessary digits, in one row, at the same time, because the machine tool will generally have to have applied to it commands dealing with factors other than the coordinates.

It will be appreciated, therefore, that a punched tape which is of sufficient width to accommodate all of the digits or positions of all of the data in one row would have to be very wide, so much so as to cause a number of difficulties; for instance, it is exceedingly difficult to read a very wide tape without running the risk of errors.

It is, therefore, an object of the present invention to provide a solution to the problem of how to use a conventional 5-hole or 8-hole punched tape despite the fact that the total data, namely, information, commands, or other signals, having a positional or digital width of some 20 bits has to have all of its bits presented at the same time.

With the above basic object in view, the present invention relates to a numerical control arrangement, particularly an arrangement for use with work tools, having a band-shaped record carrier (punched tape, magnetic tape, film strips, or the like) containing the work program, which record carrier has commands arranged in rows, extending transverse to the direction in which the record carrier is fed, and is interrogated by a reader in serial representation. Basically, the invention resides in that the number of parallel positions (for instance, 8 bits) carried by the record carrier is smaller than the number of positions (for instance, 20 bits), which the control arrangement has to have presented to it in parallel, i.e., at the same time, that the parallelly represented commands are divided into groups and are applied in serial representation, and these groups are interrogated, row by row, one after the other, with the row contents being fed into command storage devices assigned to these groups.

Stated differently, the present invention resides in a control arrangement which comprises a band-shaped record carrier capable of carrying, in each of a series of rows extending transverse to the length of the carrier, a given maximum number of indicia means but actually carrying an intelligence value made up of a number of positions which is greater than this given maximum number, the positions of this value being divided into a plurality of groups located in a plurality of rows, respectively. Such a record carrier is used with a circuit arrangement incorporating means for interrogating the plurality of rows of the record carrier one after the other, a plurality of output storage devices corresponding in number to the number of rows among which the positions of the value are divided, each of which output storage devices pertains to a respective one of the plurality of rows, and means connected to the interrogating means for applying the intelligence contained in the plurality of rows to the respective, pertaining output storage device. As a result, all of the positions of the intelligence value are available simultaneously at the outputs of the plurality of output storage devices.

According to a further feature according to the present invention, word and command addresses are applied between the commands, the digital signals correspond to the word addresses being stored in a word address selector and the digital signals correspond to the command addresses being stored in a command address selector; furthermore, the word and command address selectors control command storage devices pertaining to the groups.

According to another feature, the output of the word address selector is connected to the input of a command address selector, which is controlled by the command addresses and the previously selected word addresses.

According to yet another feature, the word address selector, the command address selector, and the command storage elements are electronic components which are interconnected galvanically, i.e., metallically conductively, without the intermediary of a capacitative element.

Additional objects and advantages of the present invention will become apparent upon consideration of the following description when taken in conjunction with the accompanying drawings in which.

Figure 1:
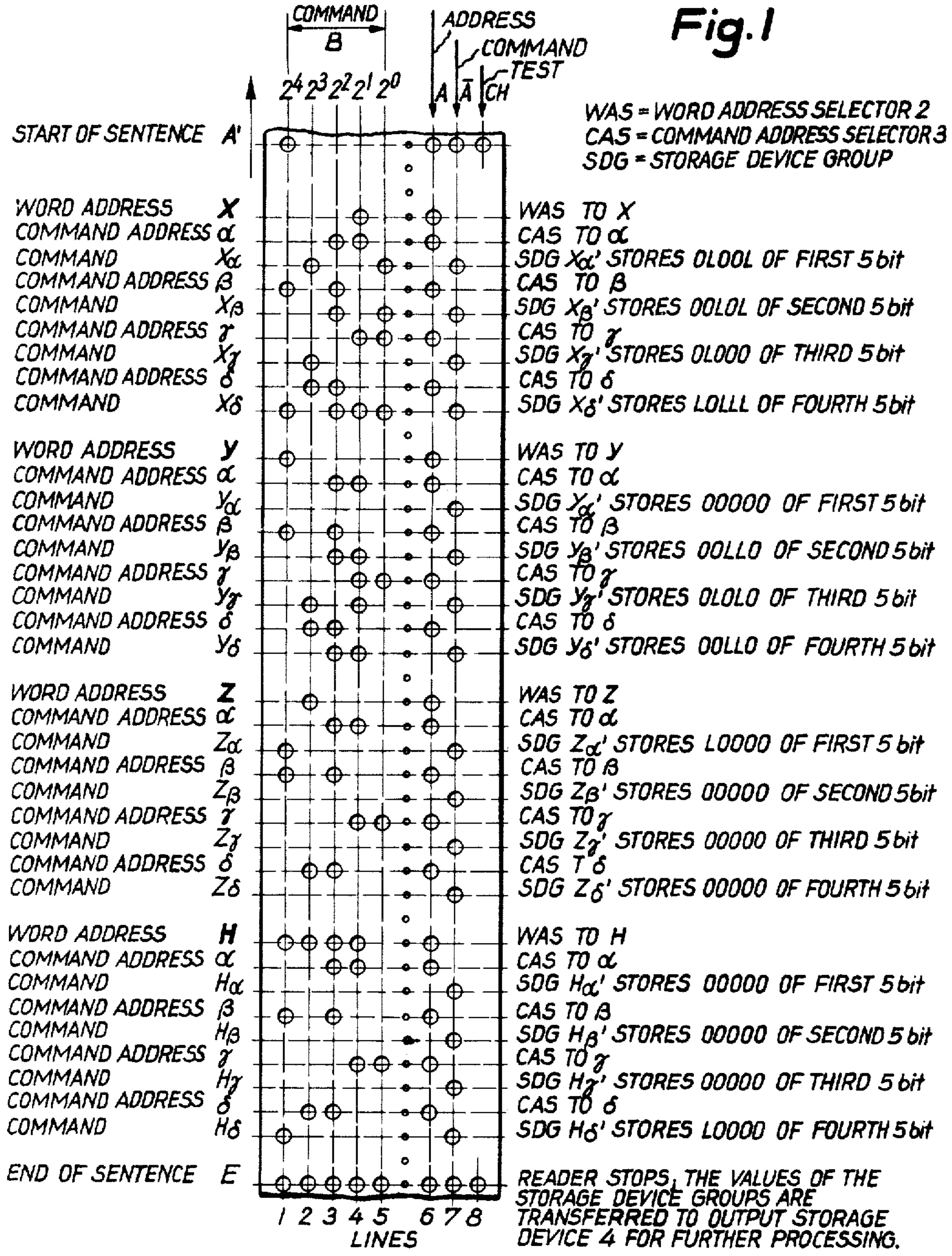
FIGURE 1 is a schematic illustration of a section of an 8-hole punched tape carrying indicia means in the form of "hole" and "no hole."

Referring now to the drawings, FIGURE 1 shows an elongated record carrier in the form a tape containing encoded commands, constituting, for example, the program of a machine tool. The individual steps commanded by the program and constituting a particular, coherent operation can be designed as a "sentence," each containing "words," each representing the commands pertaining to the individual steps which make up the coherent operation.

In the case of a machine tool program, there are definite "words" in a "sentence." For example, there will be the starting and end points of a line along which the movable component of the machine tool is to move; see, for instance, the arrangement shown in application Serial No. 78,574, filed December 27, 1960, by Heing Günter Lott, Elmer Götz, and Peter Boese, now Patent No. 3,109,092, issued October 29, 1963, which can process such data and, by interpolation, cause a work tool to follow a given curve composed of rectilinear and/or curvilinear portions. These points may be the appropriate coordinates X, Y, Z, H, etc. X, Y, Z, H, etc. themselves represent four "words." The program may also tell whether the path between these points is to be rectilinear or curvilinear; this requires an additional "word." Another "word" is required in order to indicate at what speed the curve portion between the two points is to be traversed, so that depending on the requirements of the work tool, a plurality of "words" will have to be given.

The "words" consist of "commands" which are characterized by preceding "addresses," namely, "word addresses" and "command addresses." Depending on the particular operations to be carried out by the machine tool, there may be more than 100 "sentences" containing the appropriate "words."

In the case of an 8-hole punched tape, as shown in FIGURE 1, there are $2^8$ combinations, so that there exist 256 possibilities. This will be fully sufficient for accommodating all of the commands, etc., for purposes of a numerical control arrangement for a machine tool. In general, not all of these possibilities are exhausted, so that testing may be carried out simultaneously.

The tape of FIGURE 1 has eight tracks, or lines, running in longitudinal direction and numbered from 1 to 8. According to the present invention, if the number to be applied to the tape having a width of 8 bits has an actual width of, for instance, 20 bits, this 20 bit value is distributed among four rows each having a five-hole width. The five-hole width is taken up by the lines 1 through 5, as indicated by the legend "Command B." This leaves three holes free in every row, namely, the holes pertaining to lines 6 through 8, which can be used for identification and testing. The holes of line 6 indicate whether an address is involved, the holes of line 7 indicate whether a command is involved, and the holes of line 8 are used for testing. The lines 6, 7, 8, are marked A, $\overline{A}$, CH, respectively.

As indicated at the left of the tape section, the arrange- according to the instant invention uses word addresses, command addresses, and commands. In the illustrated example, the coordinates X, Y, Z, H, are marked with word addresses.

As mentioned above, the values applied to the tape are distributed in groups of 5 bit width each. If there is a value having a width of 20 bits, this value is divided into four groups. On the other hand, all of the positions of the thus-divided value of 20 bits should, at the output, appear simultaneously, i.e., in parallel presentation. In the illustrated example, the four groups of 5 bit width are marked by the command addresses $\alpha$, $\beta$, $\gamma$, and $\delta$, as shown in FIGURE 1. The comands pertaining to the word and command addresses, for example, the commands pertaining to the X coordinate, are marked $X_\alpha$, $X_\beta$, $X_\gamma$, and $X_\delta$. The same applies to the other coordinates Y, Z, H. The "commands" of the tape according to FIGURE 1 may thus represent the characteristic data of a curve which the machine tool is to follow. The command addresses are thus required in order to differentiate the 20 bits in their positions.

If there is an address, this is indicated by the fact that there is a hole in line 6 (A), and if there is a command, this is indicated by a hole in line 7 ($\overline{A}$). The word address indicates to the control arrangement which coordinate is to be treated. The succeeding command address indicates which group of the divided word is to follow. The subsequent command then gives the value of this group, which is, of course, but a part of the total value.

Figure 2:
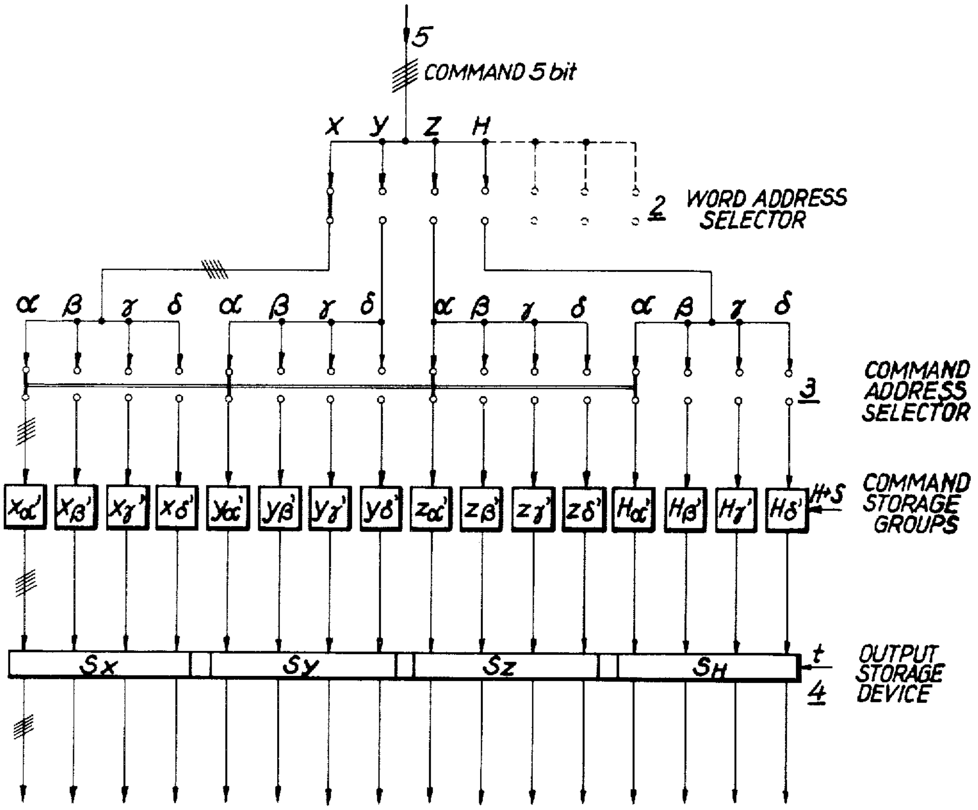
FIGURE 2 is a schematic showing of how the individual commands reach the appropriate output storage device.

According to the present invention, there are word address and command address selectors for the word addresses and command addresses. FIGURE 2 shows the cooperation between the words carried, in the above-described divided manner, by the tape, the word and command addresses, and word and command address selector and the command leads.

The arrangement comprises a word address selector 2 to whose output a command address selector 3 is connected. The word address selector 2 is arranged so as to process the four coordinates X, Y, Z, H, and the command address selector is arranged to process the number of group values. As above, it is assumed that there is an input value having a 20 bit width, which input value is distributed in four groups $\alpha$, $\beta$, $\gamma$, $\delta$, each having a width of 5 bits. These four groups are assigned to each coordinate, namely X, Y, Z, H.

The outputs of the command address selector 3 are connected to sixteen command storage device groups $X_\alpha'$ to $H_\delta'$ pertaining to the coordinates X, Y, Z, H, as shown in FIGURE 2. An output storage device 4 is connected to the command storage device groups, this output storage device being subjected to clock pulses as indicated at $t$. Once this output storage device 4 is full, all of the stored values can be given out simultaneously. The output storage device 4 is thus able to handle values of a width of $4\times20=80$ bits.

The signals on the tape of FIGURE 1 are fed into the arrangement shown in FIGURE 2 via a channel, indicated schematically at 5, the word address selecter 2 being used for making the selection. If, for instance, the tape carries the word address X, the word address selector 2 assumes the position X, as shown. If then the word address $\alpha$ appears, the command address selector 3 assumes the position $\alpha$, as shown. Thus, the path for following command $X_\alpha$ is established so that it will reach, via the word address selector 2 and the command address selector 3, the storage group $X_{\alpha'}$. This storage group will then receive and store the 5 bit wide command $X_\alpha$. If next the command address $\beta$ appears on the tape, the command address selector assumes the position $\beta$. The corresponding command $X_\beta$ which then comes from the tape passes through the word address selector 2, which has not changed its position, and through the command address selector 3 which is now in the position $\beta$, so that the 5 bit wide command arrives at the storage group $X_{\beta'}$. This process is followed when the command addresses $\gamma$, $\delta$, appear on the tape.

Similarly, the signals travel through the above-described components when the word addresses Y, Z, H, and the command addresses $\alpha$, $\beta$, $\gamma$, $\delta$, appear on the tape, so that the signals will be applied to appropriate storage groups.

The operation shown in FIGURE 2 can at once be seen from the tape of FIGURE 1. As stated above, the sequence of word addresses together with the respective command addresses and commands is shown at the left. The positions which the arrangement of FIGURE 2 will assume in response to these signals are shown at the right of the tape of FIGURE 1.

The first signal is X and is identified as a word address by the hole in line 6, so that the word address selector 2 is switched to X. The next signal is a command address $\alpha$, identified as such by another hole in line 6, which switches the command address selector 3 to $\alpha$. Once the word address X and command address $\alpha$ have been presented, the command storage group $X_{\alpha'}$ is ready to receive the actual command value 0L00L, constituting, for instance, the highest-order 5 bit of the over-all 20 bit value. The value 0L00L is obtained by the fact that only the lines 2 and 5 have holes, whereas lines 1, 3, and 4, have none (no hole=0, hole=L). Next, the command address $\beta$ appears, which switches the command address selector 3 to the position $\beta$. This is followed by the command $X_\beta$, and the corresponding storage group $X_{\beta'}$ receives the value 00L0L of the second 5 bit of the 20 bit value. Next comes the command $\gamma$ which switches the command selector 3 to position $\gamma$, whereupon the command $X_\gamma$, having a value 0L000 and constituting the third 5 bit, is stored in storage group $X_{\gamma'}$. Finally, there appears the command address $\delta$, causing the command address selector to assume the position $\delta$, and the succeeding command L0LLL constituting the fourth 5 bit is stored in storage groups $X_{\delta'}$.

In a similar manner, the values pertaining to the coordinates Y, Z, and H, are fed into the appropriate storage groups.

The strip section of FIGURE 1 shows a "sentence" having four "word" X, Y, Z, H. The sentence commences with a sentence start A′ and an end E. The individual lines 1 to 5 under "Command B" of the tape may, for instance, carry the intelligence, in the form of "hole"= L or "no hole"=0, shown in FIGURE 1.

When the signal indicating the end of the sentence, namely, E, appears, the reader interrogating the tape will stop, and the command storage groups will pass their contents on to the output storage devices 4, the previously contained signals therein having been cleared.

It will be seen from the above that, by using successive parallel groups a value can be represented whose width is greater that that which could be accommodated if the entire width of the tape were used. The partial values represented by the groups are successively interrogated by a reader, and the contents of these groups is applied to respective command storage groups. These groups have the information fed thereinto one after the other so that, once this filling operation has been completed, the entire 20 bit width of the value is available, for parallel, i.e., simultaneous, presentation at the output. In other words, the total value is applied into storage groups sequentially so as to form, at the end, the over-all total width value all of whose positions are available, at one time, at the outputs of the storage groups. As a matter of expedience, this building up of the total value occurs from the highest to the lower order positions. As shown in FIGURE 2, the total 20 bit value can be put out at one time by applying a clock pulse to the output storage device 4.

It will be noted that as soon as the command storage groups have passed their contents on to the output storage device 4, the command storage groups are ready to have a fresh set of partial values applied to them.

It is not absolutely essential that the sequence of word address, command address, and command follow the precise sequence shown in FIGURE 1. For example, the command $X_\alpha$ may be followed by the word address Y, which, in turn, may be followed by command address, $\beta$ for the word address Y and then the command $Y_\beta$.

Figure 3:
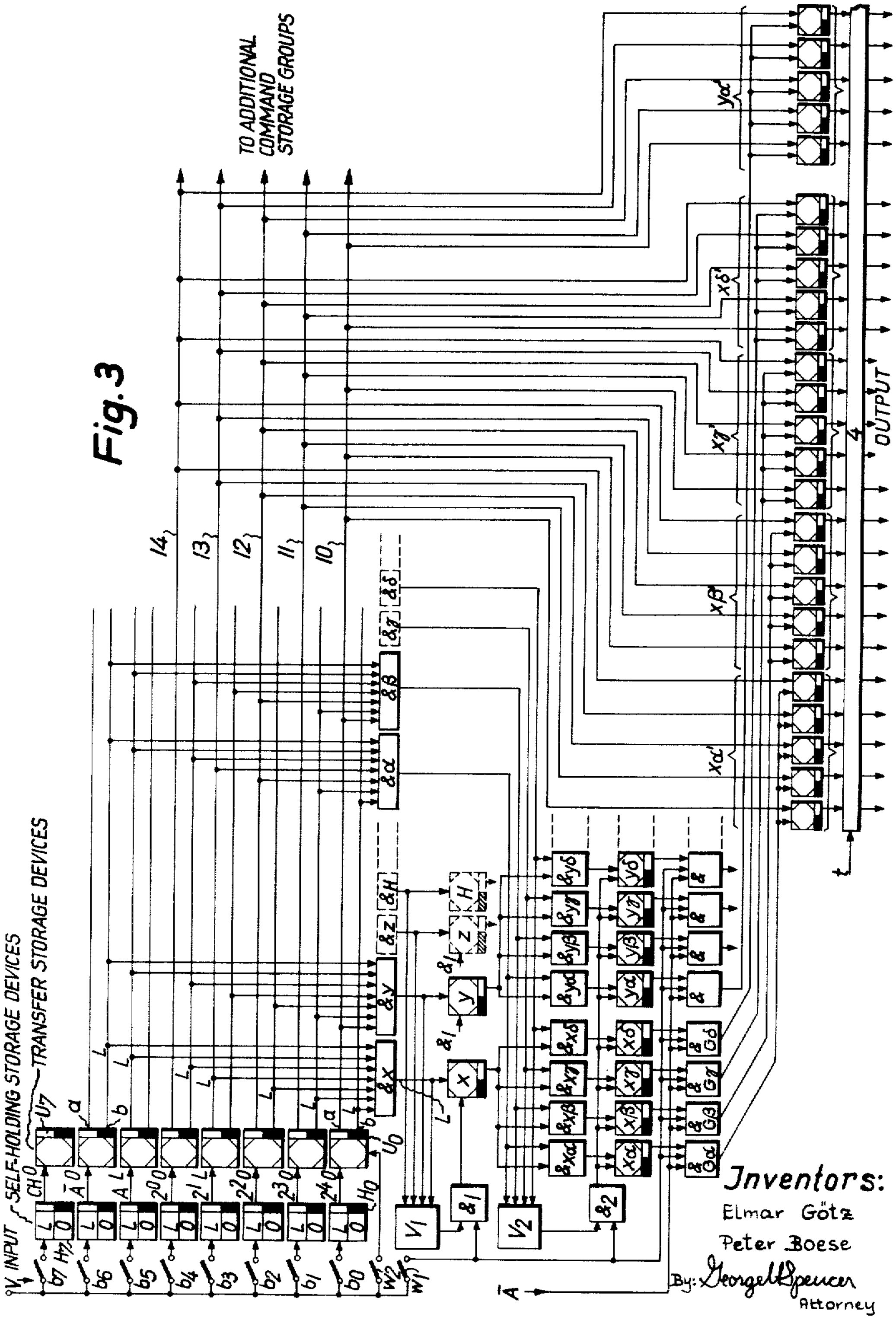
FIGURE 3 is a schematic illustration of a circuit arrangement according to the present invention.

FIGURE 3 shows one embodiment of a control arrangement according to the present invention. Except for the reader which interrogates the tape, only electronic components are used, and the circuitry is so arranged as to include no capacitative connecting elements but only galvanic, i.e., direct metallic conductive, connections.

Referring now to FIGURE 3, the same shows an input comprising reader contacts $b_0$ to $b_7$, one terminal of each of which is connected to a suitable voltage source V. Also shown is a roller which cooperates with the reader contacts and has contacts $W_1$, $W_2$. The eight contacts $b_0$ to $b_7$ are arranged immediately below a punched tape (not shown in FIGURE 3). If there is a hole which comes in alignment with a given reader contact, a punch brush extends through the hole and comes into contact with the reader contact. The switch constituted by these contacts is then closed. If there are no holes, the contacts remain open. A closed contact is considered to have the value L, and an open contact the value 0.

The reader contacts are connected to self-holding storage devices $H_0$ to $H_7$ which may, for instance, be of the type shown in German Patent No. 1,082,297. The purpose of these storage devices is the following: the reader contacts $b_0$ to $b_7$ have a tendency, when being closed, to rebound. Inasmuch as this rebounding may, under certain circumstances, lead to wrong actuation of the electronic circuit component connected to the switches, some means must be provided for preventing this, and it is for this reason that the holding storage devices are provided. When one of the reader contacts $b_0$ to $b_7$ closes for the first time, the respective self-holding storage device is brought into a given condition, so that even if the reader contact thereafter opens and closes, due to the rebounding, this will have no effect on the state of the respective self-holding storage device. Once a particular reader contact is closed, the input of the respective storage device=L, as does the output. Subsequent closings of the contact due to rebounding will not change this.

The self-holding storage devices $H_0$ to $H_7$ can be cleared by means of the contacts of the roller forming part of the reader, in a manner which will be obvious to a person skilled in the art so that a detailed explanation thereof may be dispensed with, suffice it to say that so long as the punched tape is being passed through the reader, the storage devices $H_0$ to $H_7$ will be cleared, by means of the roller contact $w_1$ shown in FIGURE 3, whereupon the output of the storage devices $H_0$ to $H_7$ will assume the value 0. However, once the self-actuating storage devices $H_0$ to $H_7$ have been actuated by the position of the reader contacts $b_0$ to $b_7$ (open=0, closed=L), the thus-actuated self-holding storage devices $H_0$ to $H_7$ will present the values L, or 0.

The outputs of the storage devices $H_0$ to $H_7$ are connected to the inputs of transfer storage devices $U_0$ to $U_7$ which serve to take over the values L or 0 contained in the storage devices $H_0$ to $H_7$. The roller contact $w_2$ causes all of the transfer storage devices to take over the values L or 0 appearing at the outputs of the respective self-holding storage devices. The transfer storage device, too, can be cleared simultaneously, in a suitable manner, not shown. The transfer storage devices $U_0$ to $U_7$ will thus have stored therein the particular value carried by the previous row of the tape (FIGURE 1). Each of the transfer storage devices has two outputs of different valuation; if the value L appears at the input of one of these transfer storage devices, then its output *a* will have the same value L whereas the value at the other output *b* will=0; conversely, if it is the value 0 which appears at the input, then the output at *a* will be 0 whereas the output at *b* will be L.

The outputs *a* of the transfer storage devices $U_0$ to $U_4$ are connected to command leads 10 to 14. The outputs *a* and *b* of transfer storage devices $U_0$ to $U_6$ are connected to a logic circuit constituting decoders for the word and command addresses carried by the tape; these logic circuits are labelled so as to be consistent with the tape of FIGURE 1, namely, $\&_X$, $\&_Y$, $\&_Z$, $\&_H$, the latter two being shown in dotted lines only. The decoders for the command addresses are indicated at $\&_\alpha$, $\&_\beta$, $\&_\gamma$, $\&_\delta$; here, too, the latter two are shown in dotted lines.

A consideration of the connection to the word address decoder $\&_X$ to the outputs of the transfer storage devices $U_0$ to $U_6$, together with the tape illustrated in FIGURE 1, will show that upon the occurrence of the word address X (which will, distributed over lines 1 to 8 =000L0L00) at the inputs of the transfer storage devices $U_0$ to $U_7$ (FIGURE 3, inputs=000L0L00), the value L appears at the input of each word address decoder $\&_X$ (FIGURE 3). Consequently, the value L will appear at the output of decoder $\&_X$. The same holds true for the word address decoder $\&_Y$ when the word address Y appears on the tape. The input connection to decoders $\&_Z$, $\&_H$, have been omitted for the sake of clarity, it being understood that they are similar to those of the other two.

The command address decoders $\&_\alpha$, $\&_\beta$, etc., are similarly connected to the outputs of the transfer storage devices $U_0$ to $U_6$ so that upon the occurrence of a command address, the value L will appear at the output of the corresponding command address decoder. Here, too, the input connections of the command address decoders $\&_\alpha$, $\&_\beta$, only are shown, the additional command address decoders $\&_\gamma$, $\&_\delta$, being shown in dotted lines only. FIGURE 3 does, however, show the ouputs of decoders $\&_\gamma$, $\&_\delta$, at which the value L will appear upon the occurrence of a corresponding command address. Similarly, only the outputs of decoders $\&_Z$, $\&_H$, are shown.

The outputs of the word address decoders are connected to pulse controlled storage devices X, Y, Z, H. These storage devices are actuated by a logic circuit comprising, for example, an OR stage $v_1$ and an AND stage $\&_1$. When the value L appear at the two inputs of the AND stage $\&_1$, the value L appears at the output thereof, this output being connected to the pulse input of the storage devices X, Y, Z, H, so that the same are opened. If the value L, coming from the word decoders $\&_X$, $\&_Y$, $\&_Z$, $\&_H$, is being applied to one of these storage devices, such value is then received in the particular storage device. The value L can appear at the output of the AND stage $v_1$ only when the contact $w_1$ of the reader roller is closed, which is the case when the roller is in rest position.

The outputs of the storage devices X, Y, Z, H, are connected to logic circuits constituted by AND stages $\&_{X\alpha}$, $\&_{X\beta}$, $\&_{X\gamma}$, $\&_{X\delta}$; $\&_{Y\alpha}$, $\&_{Y\beta}$, $\&_{Y\gamma}$, $\&_{Y\delta}$, and so on, which are also connected to the command address decoders $\&_\alpha$, $\&_\beta$, $\&_\gamma$, $\&_\delta$. The outputs of the logic circuits are connected to static pulse controlled storage devices $X_\alpha$, $X_\beta$, $X_\gamma$, $X_\delta$; $Y_\alpha$, $Y_\beta$, $Y_\gamma$, $Y_\delta$, and so on. These storage devices are controlled by a further logic circuit consisting of an OR stage $v_2$ and an AND stage $\&_2$. The storage devices $X_\alpha$, etc., store a value L when the respective word and command addresses are present.

The outputs of the storage devices $X_\alpha$, etc., are connected to a further logic circuit incorporating elements $\&_{G\alpha}$, $\&_{G\beta}$, etc., which circuit operates as a command path selector. This circuit is actuated by the roller contact $w_1$ and the command contact $\overline{\lambda}$ of the tape of FIGURE 1, whose output signal $\overline{\lambda}$ appears at the output of the storage device $H_6$. If all of the inputs of one of the elements $\&_{G\alpha}$, etc. =L, the output of such element will likewise =L. The logic circuit incorporating these elements controls a set of further command storage groups $X_{\alpha'}$, $X_{\beta'}$, $X_{\gamma'}$, $X_{\delta'}$; $Y_{\alpha'}$, $Y_{\beta'}$, etc., which groups are constituted by static pulse controlled storage devices.

The partial values (commands) of the total command distributed over the width of the band-shaped record carrier and applied to the command leads 10 to 14 (FIGURE 3) are taken over, upon the occurrence of the signal $\overline{\lambda}$, by the respective command storage group, i.e., the respective storage group will take over the command coming, via leads 10 to 14, from the record carrier. The partial values are assigned to the proper command storage groups by means of the word and command address decoders, the word and command address selector in conjunction with the command path selector, and the logic circuits $v_1$, $\&_1$, and $v_2$, $\&_2$, which control these components.

Thus, the addresses and commands which have been applied to the record carrier in serial presentation appear in parallel presentation after all of the command storage groups have been filled.

The output storage device 4 is connected to the outputs of the storage groups, which storage device 4 is tripped by a single pulse $t$ so that the outputs of the output storage device will present all of the positions of the value in parallel form, i.e., simultaneously. In other words, the consecutively appearing intelligence presentation on the tape has been transformed into a simultaneous presentation at the output of storage device 4.

The commands carried by the tape are applied directly, via the five command leads 10 to 14, to the inputs of the command storage groups, there being no delays or obstacles anywhere along the circuit, so that as soon as a command appears on the tape, it is available at these command storage groups. However, the command is not responded to any place because all of the electronic components respond only to pulse-type signals (L or 0). The first pulse signal occurs when a word address is applied, the second, when a command address is applied, and the third, when a command is applied. The word address pulse comes from the logic circuit comprising the OR stage $v_1$ and the AND stage $\&_1$; the command address pulse comes from the logic circuit comprising the OR stage $v_2$ and the AND stage $\&_2$; the command pulse comes from the logic circuits $\&_{G\alpha}$, etc., constituting the command path selector, upon the occurrence of a signal from $\overline{\lambda}$; and the pulse $t$ for actuating the output storage device 4 comes upon the occurrence of the signal produced by the sentence end E appearing on the tape. At the time the sentence end E appears, all of the command storage groups will already have been filled, so that a set of characteristic data, as, for example, the coordinate of a point at which a machine tool is to act upon a blank, will be available. The command leads 10 to 14 will yield not only the coordinate to be traversed, but can be utilized for applying all of the other commands necessary for working the blank, as, for example, the depth of bore in the case of a drilling operation, the diameter of the bore, etc. All of these commands were applied consecutively into the command storage groups, it being expedient, as stated above, to carry out the storing by first placing the higher order values into the storage groups. If, then, a distance of 10 m. is to be covered, the highest order values pertaining to this coordinate will be applied to the storage groups first, and only then the lower order values. The reason for this is that, by the time the machine has started to obey the higher order positions of the command, the lower order positions will long since have been fed into the command storage groups, i.e., by the time the movable component of the machine tool has reached the approximate position as determined by the higher order commands, the lower order or more accurate positioning orders will be available.

The arrangement is furthermore such that the command storage groups can be cleared after their contents has been passed on. The same applies to the output storage device 4.

It will be understood that the above description of the present invention is susceptible to various modifications, changes, and adaptations, and the same are intended to be comprehended within the meaning and range of equivalents of the appended claims. For instance, the record carrier need not be a punched tape, but can be magnetic tape which is read electromagnetically, or film-type tape, including perforated paper tape, which is read photoelectrically.

What is claimed is:

1. A control arrangement comprising, in combination:

(a) a band-shaped record carrier capable of carrying, in each of a series of rows extending transverse to the length of the carrier, a given maximum number of indicia means but actually carrying intelligence values each made up of a number of positions which is greater than said given maximum number, the positions of each value being divided into a plurality of groups located in a plurality of rows, respectively, said intelligence values including commands and word and command addresses arranged between said commands;

(b) means for interrogating said plurality of rows of said record carrier one after the other;

(c) a plurality of output storage devices corresponding in number to the number of rows among which the positions of said value are divided, each output storage device pertaining to a respective one of said plurality of rows, and (d) means connected to said interrogating means for applying intelligence contained in said plurality of rows to the respective, pertaining output storage devices, said last-mentioned means comprising (1) a word address selector for receiving signals corresponding to said word address and a command address selector for receiving signals corresponding to said command addresses, said word and command address selectors being connected to respective, pertaining output storage devices for controlling the same, (2) first logic circuit means for decoding said word addresses, (3) second logic circuit means for decoding said command addresses, (4) pulse controlled storage devices connected to the output of said word address decoding means for receiving said word addresses, (5) third logic circuit means connected to said command address decoding means and to said pulse controlled storage devices, (6) static pulse controlled storage means connected to said third logic circuit means, the output of said last-mentioned storage means being connected to fourth logic circuit means which are controlled by a command signal of said record carrier, and (7) static pulse controlled command storage groups connected to said fourth logic circuit means for receiving said groups of values, whereby all of the positions of each intelligence value are available simultaneously at the output of said plurality of output storage devices.

2. A control arrangement as defined in claim 1 wherein output storage devices are connected to said command storage groups.

3. A control arrangement as defined in claim 2 wherein said output storage devices are pulse controlled to cause all of the positions of said intelligence value to be put out simultaneously.

4. A control arrangement as defined in claim 1 wherein said connecting means are constituted in their entirety by galvanic conductive components.

References Cited by the Examiner

UNITED STATES PATENTS

| | | | |
|---|---|---|---|
| 2,850,719 | 9/58 | La Manna | 340—172.5 X |
| 2,881,415 | 4/59 | Dumousseau | 340—172.5 |
| 2,891,237 | 6/59 | Sink et al. | 340—172.5 |
| 2,905,930 | 9/59 | Golden | 340—172.5 |
| 2,946,044 | 7/60 | Bolgiano et al. | 340—172.5 |
| 3,061,192 | 10/62 | Terzian | 235—157 |

MALCOLM A. MORRISON, *Primary Examiner.*